United States Patent
Chen et al.

(10) Patent No.: US 8,515,977 B2
(45) Date of Patent: Aug. 20, 2013

(54) DELTA LANGUAGE TRANSLATION

(75) Inventors: Danny Y. Chen, Austin, TX (US);
Fabian F. Morgan, Austin, TX (US);
Sandra J. Schlosser, Austin, TX (US);
Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 12/879,145

(22) Filed: Sep. 10, 2010

(65) Prior Publication Data
US 2012/0066237 A1 Mar. 15, 2012

(51) Int. Cl.
*G06F 17/30* (2006.01)

(52) U.S. Cl.
USPC ........................................................ 707/754

(58) Field of Classification Search
USPC ........................................................ 707/754
See application file for complete search history.

(56) References Cited

U.S. PATENT DOCUMENTS

| | | | |
|---|---|---|---|
| 6,598,015 | B1 | 7/2003 | Peterson et al. |
| 6,920,630 | B2 | 7/2005 | Jackson |
| 6,937,974 | B1 | 8/2005 | D'Agostini |
| 7,020,601 | B1 | 3/2006 | Hummel et al. |
| 7,110,938 | B1 | 9/2006 | Cheng et al. |
| 7,139,696 | B2 | 11/2006 | Tokieda et al. |
| 7,231,600 | B2 | 6/2007 | Zhou et al. |
| 7,624,384 | B2 | 11/2009 | Zhang et al. |
| 7,627,855 | B2 | 12/2009 | Inoue et al. |
| 7,680,646 | B2 | 3/2010 | Lux-pogodalla et al. |
| 2003/0004702 | A1 | 1/2003 | Higinbotham |
| 2003/0036976 | A1 | 2/2003 | De Ruwe |
| 2003/0126559 | A1 | 7/2003 | Fuhrmann |
| 2005/0171944 | A1 | 8/2005 | Palmquist |
| 2005/0197827 | A1 | 9/2005 | Ross et al. |

(Continued)

FOREIGN PATENT DOCUMENTS

| | | |
|---|---|---|
| EP | 07979155 A2 | 9/1997 |
| JP | 4160473 A | 9/1992 |
| JP | 4287166 A | 10/1992 |
| JP | 2009146196 A | 7/2009 |

OTHER PUBLICATIONS

Muldner T.; Internationalization of Websites; Item: Article; Date: Jun. 21-26, 2004; pp. 2040-2047; Jodrey School of Computer Science, Acadia University; Canada.

(Continued)

*Primary Examiner* — Rehana Perveen
*Assistant Examiner* — Alexander Khong
(74) *Attorney, Agent, or Firm* — Arthur Samodovitz; Robert C. Rolnik

(57) ABSTRACT

Revised component selector extracts a translation file comprising a plurality of English keys and translation language values in a database, including untranslated keys as an XML file. The revised component selector extracts a plurality of English keys and translation language values and determines whether there are XML unsupported characters in the XML file. The revised component selector first filters out the XML unsupported characters to form a resultant file, responsive to a determination that XML unsupported characters are in the XML file. The revised component second selector filters out translated data from the resultant file to form an untranslated file. The revised component selector selects a subset of data. The revised component selector, responsive to selecting, third filters out any data not included in the subset to form a translatable file, responsive to selecting. The revised component selector sends the translatable file to a translation center to translate.

17 Claims, 5 Drawing Sheets

(56) References Cited

U.S. PATENT DOCUMENTS

| | | |
|---|---|---|
| 2006/0116865 A1 | 6/2006 | Cheng et al. |
| 2007/0033579 A1 | 2/2007 | Andrews et al. |
| 2007/0061345 A1* | 3/2007 | Thompson et al. ............ 707/100 |
| 2007/0265827 A1 | 11/2007 | Wall et al. |
| 2008/0033974 A1* | 2/2008 | Cameron ....................... 707/101 |
| 2008/0077395 A1 | 3/2008 | Lancaster et al. |
| 2008/0120088 A1 | 5/2008 | Schurig |
| 2008/0120090 A1 | 5/2008 | Schurig |
| 2008/0162114 A1 | 7/2008 | Torres-rocca et al. |
| 2009/0070094 A1 | 3/2009 | Best et al. |
| 2009/0106017 A1 | 4/2009 | D'agostini |
| 2009/0248393 A1 | 10/2009 | Tomko et al. |
| 2009/0282394 A1 | 11/2009 | Raj |
| 2010/0057434 A1 | 3/2010 | Konno |

OTHER PUBLICATIONS

Lewis D.; Web Service Integration for Next Generation Localisation; Date: Jun. 2009; pp. 47-55; Centre for Next Generation Localisation, Trinity College; Ireland.

Barrachina S.; Statistical Approaches to Computer-Assisted Translation; Computational Linguistics; vol. 35, Issue 1 (Mar. 2009); ISSN:0891-2017.

Ung D; Machine Adaptable Dynamic Binary Translation; Workshop on Dynamic and Adaptive Compilation and Optimization; pp. 41-51; (2009); ISBN:1-58113-241-7.

Wu J; TotalRecall: A Bilingual Concordance for Computer Assisted Translation and Language Learning; Annual Meeting of the ACL; pp. 201-204; (2009); ISBN: 0-111-456789.

* cited by examiner

```
<?xml version="1.0" encoding="utf-8"?>
<DATABASE src="jdbc:db2://ipaddress:port/dbName">
    <TABLE name="MAXATTRIBUTE">
        <RECORD ATTRIBUTENAME="DFLTGROUP" OBJECTNAME="ACCOUNTDEFAULTS">
            <TEXT column="REMARKS" lang="EN" maxlength="4000">Group type</TEXT>        ⎫ 341
            <TEXT column="REMARKS" lang="FR" maxlength="4000">Type de groupe</TEXT>
            <TEXT column="TITLE" lang="EN" maxlength="80">Group type</TEXT>            ⎫ 343
            <TEXT column="TITLE" lang="FR" maxlength="80">Type de groupe</TEXT>
        </RECORD>
        <RECORD ATTRIBUTENAME="ITDREGION" OBJECTNAME="ADDRESS">
            <TEXT column="REMARKS" lang="EN" maxlength="4000">Region</TEXT>
            <TEXT column="REMARKS" lang="FR" maxlength="4000">null</TEXT>              ⎫ 345
            <TEXT column="TITLE" lang="EN" maxlength="80">Region</TEXT>
            <TEXT column="TITLE" lang="FR" maxlength="80">null</TEXT>                  ⎫ 347
        </RECORD>
    </TABLE>
</DATABASE>
```

Brace 335 groups the four TEXT lines of the first RECORD; 340 groups the first RECORD block.

```
<?xml version="1.0" encoding="utf-8"?>
<DATABASE src="jdbc:db2://ipaddress:port/dbName">
  <TABLE name="MAXATTRIBUTE">
   <RECORD ATTRIBUTENAME="ITDREGION" OBJECTNAME="ADDRESS">
     <TEXT column="REMARKS" lang="EN" maxlength="4000">Region</TEXT>
     <TEXT column="REMARKS" lang="FR" maxlength="4000">null</TEXT>
     <TEXT column="TITLE" lang="EN" maxlength="80">Region</TEXT>
     <TEXT column="TITLE" lang="FR" maxlength="80">null</TEXT>
   </RECORD>
  </TABLE>
</DATABASE>
```

*FIG. 5*

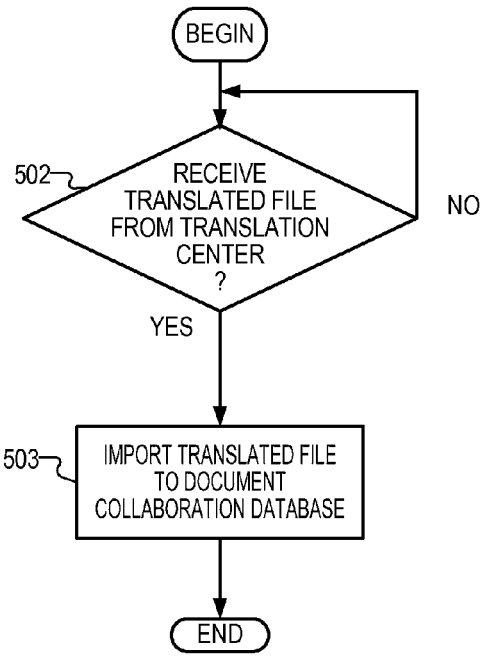

<?xml version="1.0" encoding="utf-8"?>
<DATABASE src="jdbc:db2://ipaddress:port/dbName">
  <TABLE name="MAXATTRIBUTE">
    <RECORD ATTRIBUTENAME="ITDREGION" OBJECTNAME="ADDRESS">
371    <!-- START NON-TRANSLATABLE -->
       <TEXT column="REMARKS" lang="EN" maxlength="4000">Region</TEXT>
373    <!-- END NON-TRANSLATABLE -->
       <TEXT column="REMARKS" lang="FR" maxlength="4000">Region</TEXT>
       <!-- START NON-TRANSLATABLE -->
       <TEXT column="TITLE" lang="EN" maxlength="80">Region</TEXT>
       <!-- END NON-TRANSLATABLE -->
       <TEXT column="TITLE" lang="FR" maxlength="80">Region</TEXT>
    </RECORD>
  </TABLE>
</DATABASE>
```

DELTA LANGUAGE TRANSLATION

BACKGROUND OF THE INVENTION

1. Field of the Invention

The present invention relates generally to a computer implemented method, data processing system, and computer program product for translating languages. More specifically, the present invention relates to translating select portions of a database used to configure data processing systems.

2. Description of the Related Art

Recent decades of trade have generated multilateral trade. Accordingly, complex machinery and media have flowed among all nations. Although many industrialized nations have significant populations that have adopted English for business purposes, many fields (for example, education) rely on equipment to be sold and supported by documentation and other help in the language of the purchasing customer.

This situation poses unique difficulties for sellers and maintainers of information technology equipment. Each time a machine and ancillary equipment are updated with revised features, a lag may occur between when the features are available to users in the country of the manufacturer, and the availability to users in the country of the customer. This lag can occur because new features may be present in user interfaces that include language displayed or spoken (via a speaker). The overall functionality of such machines may already be translated into the language of the customer. However, a new feature can add as much as 20% new and/or changed words to an existing corpus of language already translated in earlier versions of supporting software for such equipment.

Accordingly, updated information can rely on targeted translations of revisions to equipment. Importantly, finding a way to separate untranslated features from translated features can be beneficial to solving the above-stated problems.

SUMMARY OF THE INVENTION

The present invention provides a computer implemented method, system and computer program product for identifying and translating a subset of partially translated data A revised component selector extracts a translation file comprising a plurality of English keys and translation language values in a database, including untranslated keys as an Extensible Markup Language (XML) file. The revised component selector determines whether there are XML unsupported characters in the XML file. The revised component selector first filters out the XML unsupported characters to form a resultant file responsive to a determination that XML unsupported characters are in the XML file. The revised component selector second filters out translated data from the resultant file to form an untranslated file. The revised component selector selects a subset of data. The revised component selector, responsive to selecting, third filters out any data not included in the subset to form a translatable file, responsive to selecting. The revised component selector sends the translatable file to a translation center to translate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a XML file that may be an intermediate data type in accordance with an illustrative embodiment of the invention;

FIG. 3B is an untranslated file in accordance with an illustrative embodiment of the invention;

FIG. 3C is a compact file in accordance with an illustrative embodiment of the invention;

FIG. 5 is a flowchart of steps at a translation center.

DETAILED DESCRIPTION OF THE PREFERRED EMBODIMENT

Figure 1:
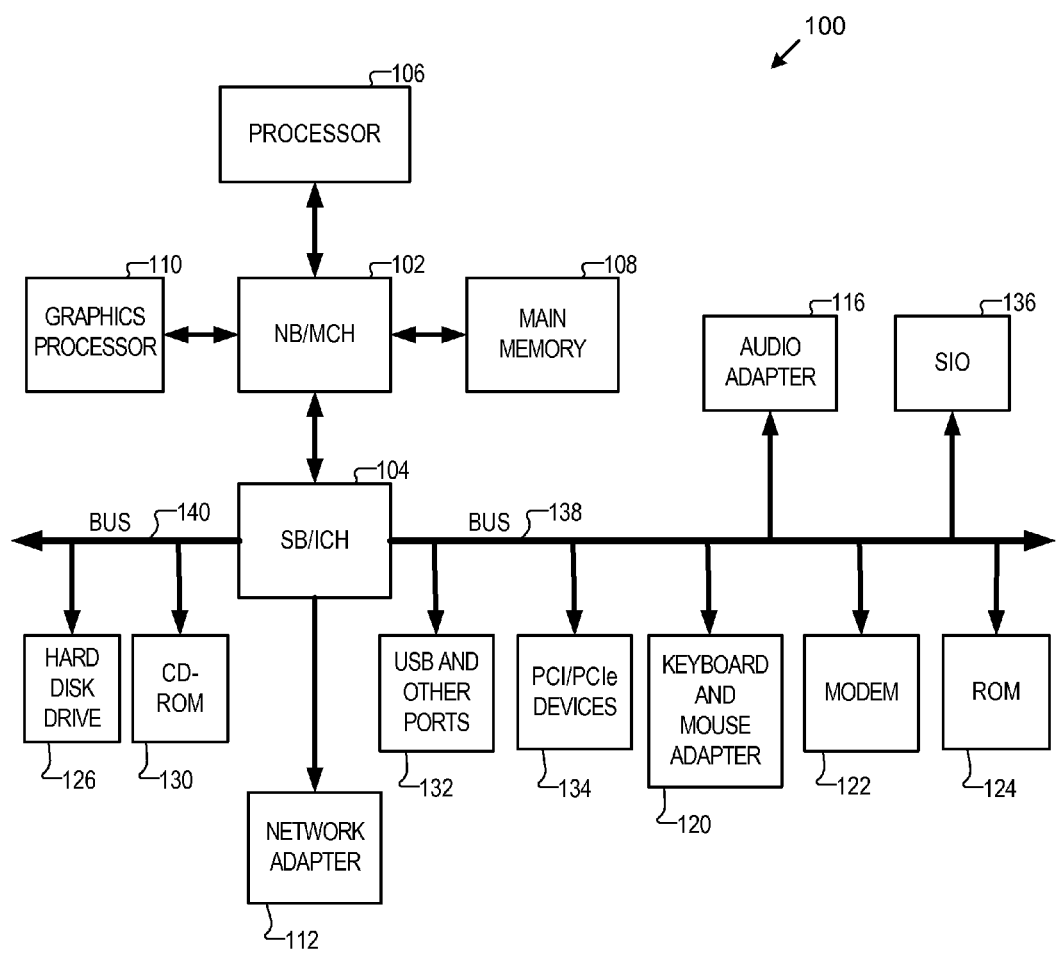
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage devices may be utilized. A computer readable storage device may be, for example, but not limited to, an electronic, magnetic, optical, or semiconductor system, apparatus, or device, or any suitable combination of the foregoing, but does not include a propagation media. More specific examples (a non-exhaustive list) of the computer readable storage device would include the following: a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can store a program for use by or in connection with an instruction execution system, apparatus, or device, but does not include a propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a selection of files from a database or other repository. The files may have a mixture of terms that are translated to a target language, as well as terms that are not yet translated, as can occur during secondary releases of software arranged to execute in data processing systems. Illustrative embodiments can more narrowly select untranslated terms, as well as contextual information. Selection can eliminate translated segments of such files that may comprise over 50% of the content of the file. In addition, some illustrative embodiments can provide guiding text to identify a beginning and end of elements, for example, as bounded by Extensible Markup Language (XML) tags, to highlight or otherwise enhance navigation to and among untranslated terms. Further illustrative embodiments can transmit such modified or generated files to translation centers, collect resulting translated files, and import such files into a document collaboration database of an equipment and software manufacturer for rapid deployment. Accordingly, deployment may be accelerated to users who prefer languages other than that of the manufacturer.

Figure 2A:
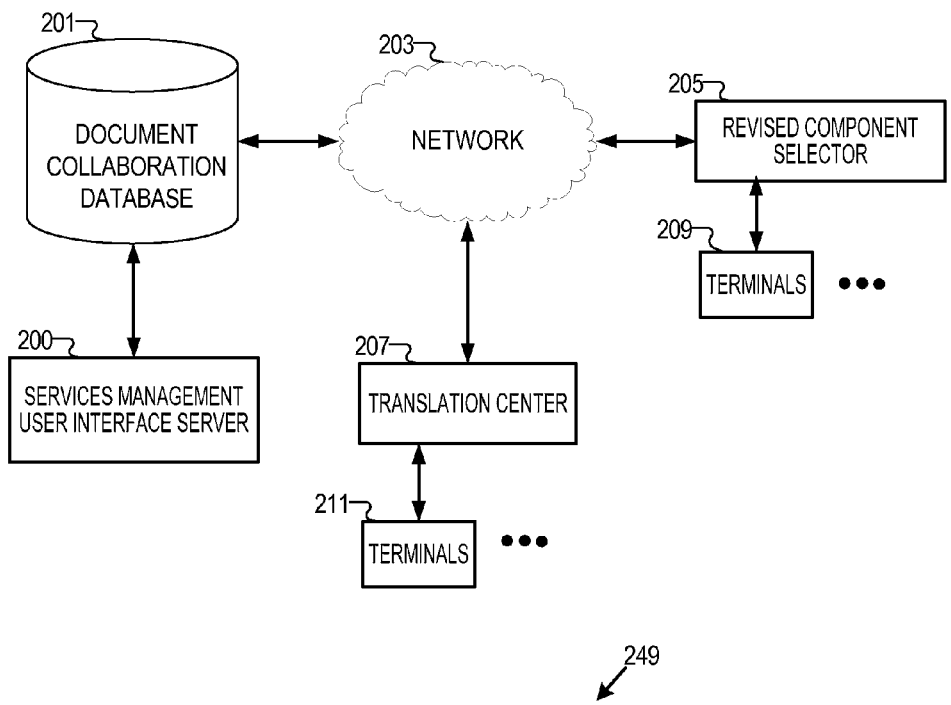
FIG. 2A is a block diagram of a network of data processing systems in accordance with an illustrative embodiment of the invention.

FIG. 2A is a block diagram of a network of data processing systems in accordance with an illustrative embodiment of the invention. A services management user interface server 200 is a data processing system used by a manufacturer of equipment, training materials to organize draft files for engineering such equipment, training materials, among other things.

Document collaboration database 201 is a repository for documents and files used in, for example, IT equipment made by the manufacturer. A database is a data store of files or objects in a manner that permits counting, sorting, and editing of the files or objects. The database's structure can include metadata with each file or document as well as provide version control. Files and documents can be stored as flat text files, XML files, or any other suitable format. Some examples of files and documents are exemplified by their data content. For example, some files can be Java scripts, configuration files, CSS files, HTML files and the like. As described earlier, each such file may depend on other files for further functionality, as for example, executing software can rely on libraries or include files so that a common library, when coupled to a data processing system, can provide functionality to additional threads that execute instructions as found in the files that so-reference the common library.

A document collaboration database is a repository of documents that may incorporate style sheets and other rendering instructions, or functional text organized according to computer compilers or interpreters. Such documents can be configuration files that may inter-operate with computer instructions to modify functionality of a computer. Such configuration files may also include descriptors of text rendered to a user interface. A format for such files can be according to the XML standards now available. Moreover, the format can be substantially XML standard compliant, although portions of the configuration file can be literal text and other characters bounded by tags that can be XML.

Network 203, can be used to permit transfer of files and documents to and from document collaboration database 201. Revised component selector 205 and translation center 207 may cooperate and exchange data via the network 203. Revised component selector 205 may be operated to select files and documents from document collaboration database 201 based on a project name entered by a user. The revised component selector can be data processing system 100 of FIG. 1. A project name is the name of product as may be modified by a feature operating within the product. A project name can correspond to a name, which can be an internal trade secret of the manufacturer that is matched to a general available release that remains in a production state prior to release for sale. The general available release can include files having software instructions, configuration files, libraries, and data structures formed in a generic manner according to a preferred language as well as mnemonics of the manufacturer. Accordingly, the files and documents that make up the content of the project can include strings suitable for rendering or display to a user. A string is a list of bytes that correspond to a character set such as, for example, Unicode, American Standard Code for Information Interchange (ASCII), or any other recognized character set.

Strings can include nonstandard characters. A nonstandard character is a character that is not supported by XML standards. XML unsupported characters are characters that are specified as invalid according to all XML standards. An example of an XML unsupported character is 0x1A. XML unsupported characters are unparseable characters. Unparseable characters cannot be parsed based on criteria of XML specifications alone.

Strings can be established in English. However, to aid in internationalization of a project, such strings can be arranged as triplets within a file. A triplet is at least three strings that are inter-related within a file or document. Each string can be formed in, for example, a comma separated file format, XML format, or any other format that links one string to the other two strings.

Translation center 207 may be a source for translations of text used in products that execute software that renders prompts and other information in a language. Translations can be performed by staff who work on terminals 211. Terminals provide a user interface to collect user input to translate at least some terms in, for example, compact files that may be transmitted to the translation center from the revised component selector 205. User input is information entered by a human using, for example, a keyboard.

Revised component selector 205 may provide a means to control execution of software executing on processors by receiving user input from terminals 209. Terminals may collect user input using dialog boxes, text editors, and other user interfaces executing within the terminals. A terminal can be a data processing system. In addition, a system administrator may enter inputs that can be used to set subset criteria by which attributes containing potential translation targets are sorted. Subset criteria are explained further below in reference to FIG. 4. User input can provide user attributes, which can be used to identify the users to which feature access is granted, and consequently, which attributes, associated with the features that are to be translated.

Figure 2B:
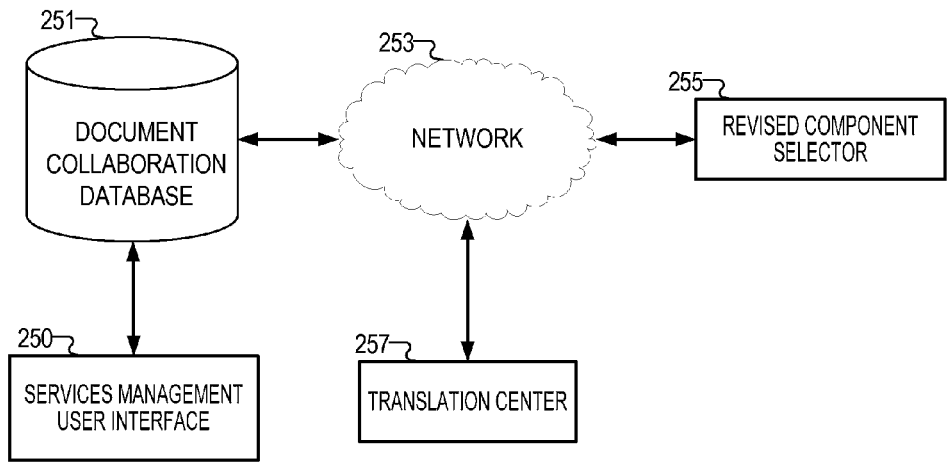
FIG. 2B is a block diagram of an alternative arrangement for a network of data processing systems in accordance with an illustrative embodiment of the invention.

FIG. 2B is a block diagram of an alternative arrangement for a network of data processing systems in accordance with an illustrative embodiment of the invention. Like FIG. 2A, alternate network 249 of data processing systems includes services management user interface 250, document collaboration database 251, network 253, revised component selector 255 and translation center 257. However, unlike FIG. 2A, alternate network 249 may rely on automated functionality of translation center 257 for translating compact files and other data sent to translation center 257. In other words, translation center 257 may not rely on users reviewing the rendered versions of the compact files. Similarly, revised component selector 255 may not need further inputs to set criteria for finding users having access to files. Accordingly, terminals may not be needed to set ad hoc criteria to determine the user-set for new features that can depend on attributes stored in the document collaboration database.

FIG. 3A is a XML file that may be an intermediate data type in accordance with an illustrative embodiment of the invention. Although file 300 is formatted using XML conventions, it may contain XML unsupported characters. An XML unsupported character can be in a string between two XML tags, such as, for example, string 341, 343, 345, and 347. XML file 300 can be a translation file selected by a user-entered topic. A translation file is a file that contains at least one triplet, where the triplet includes at least an object name, a key and a translation token. The translation file may be partially translated data. In other words, partially translated data may mean that among a group of attributes, one or more attributes lack any translation for a key, or lacks some translations for a key. The user-entered topic can be a project name, for which various files or documents may be depended upon to supply full functionality to features of the project. The user-entered topic can be a file name.

XML file 300 can be made up of multiple attributes, each of which is associated with an object. An object can be a field that provides contextual information about a manner in which a term is used within equipment controlled through the use of software. An object name is a name of the object, or context in which the object is used. Accountdefaults 335 is an example of the object. The object name and attribute name combination can be used as identifiers for use by an import program. The import program, relying on such an identifier, can correctly add newly translated data to a document collaboration database. In other words, the object name and attribute name can specify within which record in the database table the translation applies.

Attribute 340 can include multiple keys. A key is a term written in the preferred language of the manufacturer's staff coupled to a column descriptor. A key can be an English key. An English key is written substantially in English. Substantially in English means that a term uses words in English dictionaries, common misspellings of English, words in technical dictionaries and glossaries used by English speakers, including abbreviations and acronyms. English keys include, for example, "remarks/Group Type" 341, "title/Group Type" 343, among others. It is appreciated that an English key can be a phrase alone, without the "column" to distinguish the key, so long as the key is unique within the document collaboration database. Alternatively, the English key can further include the attribute name and object name in instances where such additional data can make the English key unique.

FIG. 3B is an untranslated file in accordance with an illustrative embodiment of the invention. An untranslated file is based on a file such as an XML file, but which has been filtered to contain only objects or records that lack a translation to a target language. In the case of untranslated file 350, the target language is French, denoted by 'FR'. A process step may identify objects that include a translation token corresponding to the target language. In the example of untranslated file 350, the translation token is a placeholder, "null". A placeholder is a string that is selected to signal a place for a translator or other entity to place the translation counterpart to the key. Alternative placeholders may be used so long as they are distinctive from the types of strings that are used in the manufacturer's products, and in particular, distinctive to the software that may be used in tandem with such products.

FIG. 3C is a compact file in accordance with an illustrative embodiment of the invention. Compact file 370 includes the content of the untranslated file, however the compact file includes additional comments that are enclosed in a begin comment tag and an end comment tag. An additional comment is an artifact used to denote which TEXT tags are to be translated. When the file is viewed through a translation tool, for example, at a translation center, the tags surrounded by comments can be filtered out so the translator can focus only on terms that need to be translated. Additional comments are, for example, 'START NON-TRANSLATABLE' 371 and 'END NON-TRANSLATABLE' 373. Each such comment can be braced by the begin comment tag '<!--', and the end comment tag '-->', for example. Such comments, and tags, can be beneficial to the particular tastes and operation at a translation center. For example, a translation center that relies on text processors such as, for example, Vim, can perform global searches on the content of such additional comments in order to rapidly navigate among the keys and the placeholders.

Figure 4:
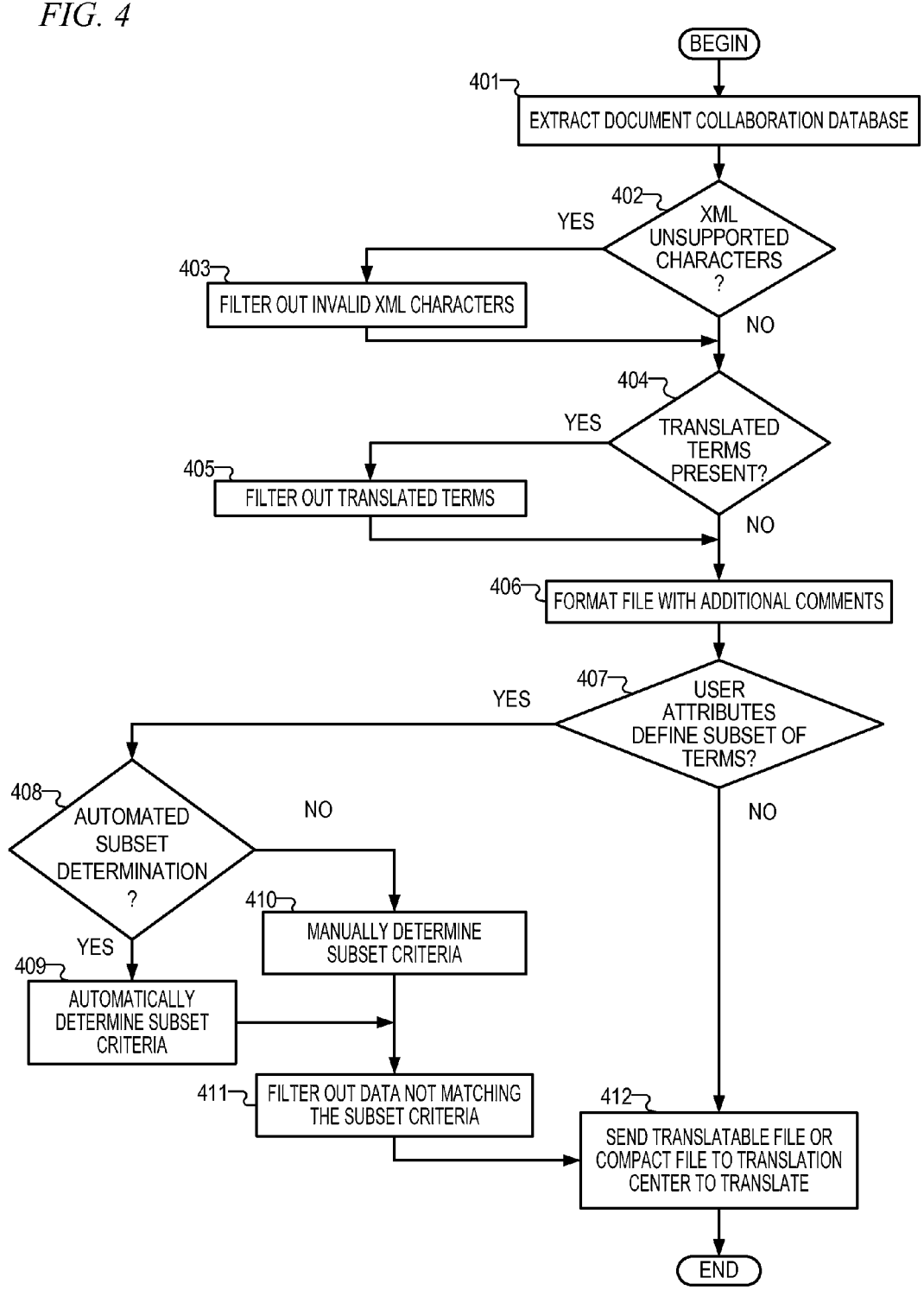
FIG. 4 is a flowchart of steps at a revised component selector in accordance with an illustrative embodiment of the invention.

FIG. 4 is a flowchart of steps at a revised component selector in accordance with an illustrative embodiment of the invention. Initially, the revised component selector may extract a translation file from the document collaboration database (step 401). Next, the revised component selector may determine whether XML unsupported characters are present in the translation file (step 402). If there are XML unsupported characters, the revised component selector may filter out the XML unsupported characters (step 403). Step 403 may produce a resultant file. A resultant file is XML-compliant in the sense that all invalid XML characters or XML unsupported characters that previously were present in the translation file are removed in the resultant file.

Next, or following a negative determination at step 402, the revised component selector may determine whether translated terms are present in the translation file (step 404). If so, the revised component selector may filter out translated terms (step 405). Filtering out translated terms can include removing attributes from the file in order to produce an untranslated file, for example untranslated file 350, of FIG. 3B. Following step 405 or the negative output of step 404, the revised component selector may have obtained an untranslated file.

Next, the revised component selector may format the untranslated file with additional comments. As explained earlier, the additional comments may be provided as a way to streamline workflow of a translation center. Accordingly, as a result of the revised component selector activity at step 406, the revised component selector may obtain a compact file, for example, compact file 370 of FIG. 3C.

Next, the revised component selector may determine if it can obtain user attributes that define a subset of terms (step 407). A user attribute is a criterion or other string that is used to match a group of users in order to determine if the user has access to projects, software based on projects, or content developed from such software. An example of a user attribute can be a security group associated with one or more users. Another example of a user attribute can be a job description of a user. In other words, the user attribute can be used to determine a group of users that have a need to know or use software.

If the revised component selector makes a positive determination, the revised component selector may determine if the user attributes are sufficient to automate a subset determination (step 408). A user attribute in the form of a security group can be sufficient to automate the subset determination, where, for example, at least one user is assigned to the security group. Accordingly, step 408 may permit the revised component selector to respond to system administrator input of the security group, or other method of identifying the correct users. The mere entry of a security group to, for example, a dialog box, does not diminish the automatic nature of the following step, step 409.

Consequently, step 409 can be reached after a positive determination at step 408. Accordingly, the revised component selector may automatically determine the subset criteria of the compact file to be translated (step 409). This step can be performed by determining which triplets are used by at least one user matched by the user attribute (criteria). In other words, if a new software feature relies on translation files, but the feature itself is not accessible to the pool of users selected in step 409, then all attributes of the compact file that support this feature are excluded from the subset. Accordingly, step 409 may yield criteria based on the users assigned or otherwise related to the attributes.

Alternatively, a negative result at step 408 can result in a system administrator manually determining subset criteria (step 410). Subset criteria are criteria used to identify attributes among triplets for use in selecting the attributes for translation, while excluding non-matching attributes from a file. Accordingly, the file can be prepared to submit to a translation center. For example, subset criteria can be a regular expression of "\w*eau" applied to the surname of each user in order to locate or match users that may prefer a French user interface. Alternatively, the subset criteria can be features that will be accessible by users, as in the automated subset criteria determination.

Next, or following either step 409 or 410, the revised component selector may use the automatically determined subset criteria or the manually determined subset criteria to filter out data not matching the subset criteria (step 411). The subset criteria include at least criteria relating to attributes. The attributes themselves may be triplets, as explained above. As a result, a subset of the compact file may be determined that narrows the attributes that require translation to only those that are used by users that meet the subset criteria. In other words, a subset of attributes of the compact file forms a translatable file. Selecting the subset criteria can include two substeps. First, it selects portions of the compact file based on the user attributes. Second, it filters out second unmatched XML tags and corresponding content based on the user attributes. These substeps reduce the subset of data and form a translatable file. When the filtering-out is based on user attributes, the filtering-out is called "user-access filtering out".

The revised component selector may transmit or send the translatable file or compact file to the translation center to translate (step 412). The translation center may be, for example, translation center 207 or translation center 257 of FIG. 2B or 2C, respectively. Processing may terminate thereafter.

FIG. 5 is a flowchart of a process by the revised component selector in accordance with an illustrative embodiment of the invention. Initially, the revised component selector may determine whether it has received a translated file from the translation center (step 502). If no translated file is received, the revised component selector may reiteratively perform step 502. In response to a translated file being received from the translation center, the revised component selector may import the translated file to the document collaboration database, for example, document collaboration database 201 of FIG. 2A. Importing can include associating new records in a database corresponding to the translated data identified by objectname, attributename and/or column.

Illustrative embodiments permit targeted reliance on translators, providing minimal materials, with some contextual support information. In addition, embodiments can weed-out additional clutter that can impair navigation among terms to be translated. Furthermore, terms for features where no business case exists for granting users access, can be similarly filtered out by applying user attributes to form criteria for narrowing the quantity of terms to translate. Such filtering and reduction methods and apparatuses as described above can allow translation to be performed shortly after new features in products are released, and for those features that users currently need or are authorized to use. As such, the outputs of translation centers can be more timely applied in the marketplace.

The swift flow of information, embellished to match user language preferences, can tangibly reward the users of equipment and systems, as well as provide advanced services to customers who rely on those users. Feature translation, as taught in the above illustrative embodiments, can provide concrete benefits to large populations by shortening the cycle time to deliver products to market, as well as upgrades to such products.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer readable storage device can be an electronic, magnetic, optical, or semiconductor system (or apparatus or device). Examples of a computer-readable storage devices include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying and translating a subset of partially translated data, the method comprising the steps of:
    extracting by a computer a translation file from a database, the translation file comprising a plurality of English keys and translation language values, and untranslated keys, wherein the extracting forms an XML file;
    determining, by the computer, whether there are XML unsupported characters in the XML file;
    responsive to a determination that XML unsupported characters are in the XML file, the computer filtering out, from the XML file, the XML unsupported characters and translated data
    such that the computer deletes from the filtered XML file, data which are XML unsupported characters based on existing XML standards;
    formatting, by the computer, the filtered XML file;
    sending the data to be translated, resulting from the filtering step, to a translation center to translate;
    receiving translated data from the translation center; and
    importing a translated file into the database.

2. The computer implemented method of claim 1, wherein the English keys are substantially in English.

3. The computer implemented method of claim 1, wherein filtering out comprises selecting a placeholder corresponding to a term having no translation in the XML file.

4. The computer implemented method of claim 1, further comprising:
    determining that a user input provides user attributes, wherein the user attributes can be used to define untranslated attributes to the user attributes; and
    selecting a subset of data based on subset criteria in response to the determination that the user input provides user attributes.

5. A computer program product for identifying and translating a subset of partially translated data, the program product comprising:
    a computer readable storage device;
    first program instructions to extract a translation file from a database, the translation file comprising a plurality of English keys and translation language values, and untranslated keys as an XML file;
    second program instructions to determine whether there are XML unsupported characters in the XML file;
    third program instructions to filter out, from the filtered XML file, the XML unsupported characters and translated data;
    fourth program instructions to delete, from the filtered XML file, data which are XML unsupported characters based on existing XML standards;
    fifth program instructions to format, by the computer, the filtered XML file;
    sixth program instructions to send the data to be translated, resulting from the filtering step, to a translation center to translate;
    seventh program instructions to receive translated data from the translation center; and
    eighth program instructions to import a translated file into the database, wherein the first, second, third, fourth, fifth, sixth, seventh and eighth program instructions are stored on the computer readable storage device.

6. The computer program product of claim 5, wherein the English keys are substantially in English.

7. The computer program product of claim 5, further comprising ninth program instructions to select a placeholder corresponding to a term having no translation in the XML file.

8. The computer program product of claim 5, wherein third program instructions to filter out further comprises:
    ninth program instructions to determine that a user input provides user attributes, wherein the user attributes can be used to define untranslated attributes to the user attributes; and
    tenth program instructions to select a subset of data based on subset criteria in response to the determination that the user input provides user attributes, wherein selecting the subset comprises selecting portions of the data to be translated based on the user attributes, and filtering out unmatched XML based on the user attributes, to reduce the subset of data to a smaller subset.

9. A computer system for identifying and translating a subset of partially translated data, the system comprising:
    a processor, a computer readable memory and a computer readable storage device;
    first program instructions to extract a translation file from a database, the translation file comprising a plurality of English keys and translation language values, and untranslated keys, wherein the extracting forms an XML file;

second program instructions to determine whether there are XML unsupported characters in the XML file;
third program instructions to filter out, from the filtered XML file, the XML unsupported characters and translated data;
fourth program instructions to delete, from the filtered XML file data which are XML unsupported characters based on existing XML standards;
fifth program instructions to format, by the computer, the filtered XML file;
sixth program instructions to send the data to be translated, resulting from the filtering step, to a translation center to translate;
seventh program instructions to receive translated data from the translation center; and
eighth program instructions to import a translated file into the database, wherein the first, second, third, fourth, fifth, sixth, seventh and eighth program instructions are stored on the computer readable storage device for execution by the processor via the computer readable memory.

10. The computer system of claim 9, wherein the English keys are substantially in English.

11. A computer implemented method for identifying and translating partially translated language data, the method comprising:
extracting, by a computer, a translation file selected by a user-entered topic, the file having a plurality of triplets comprising, an object name, a key, and a translation token, wherein the translation token is a placeholder;
determining, by the computer, whether there are nonstandard characters in the translation file;
responsive to a determination that nonstandard characters are in the translation file, filtering out, by the computer, the nonstandard characters to form a resultant file;
filtering out, by the computer, translated data from the resultant file to form an untranslated file;
formatting, by the computer, the untranslated file with additional comments;
selecting a subset of data from the untranslated file based on a subset criteria;
responsive to selecting, filtering out, by the computer, any data not matching the subset criteria to form a translatable file;
sending the translatable file to a translation center to translate;
receiving the resultant file as a translated file from the translation center, wherein the translation file is a XML file; and
importing the translated file into a document collaboration database.

12. The computer implemented method of claim 11, wherein nonstandard characters are unparseable characters with respect to criteria of the XML specification.

13. The computer implemented method of claim 12 wherein the XML specification is XML 1.1.

14. The computer implemented method of claim 11, wherein the translation center is a data processing system configured to automatically translate terms in a translatable file.

15. The computer implemented method of claim 11, wherein the translation center obtains user input to translate at least some terms of the translation file.

16. The computer implemented method of claim 11, wherein the placeholder is a string and wherein the user-entered topic is a file name.

17. The computer implemented method of claim 11, wherein the translation file has more terms corresponding to translated terms, than has terms not corresponding to a corresponding translation.

* * * * *